UNITED STATES PATENT OFFICE.

EDUARD MÜNCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

THIOSALICYLIC COMPOUND AND PROCESS OF MAKING SAME.

943,560.         Specification of Letters Patent.     Patented Dec. 14, 1909.

No Drawing.      Application filed September 1, 1908.  Serial No. 451,249.

*To all whom it may concern:*

Be it known that I, EDUARD MÜNCH, doctor of philosophy and chemist, a subject of the Grand Duke of Baden, and residing at Ludwigshafen-on-the-Rhine, in the country of Germany, have invented new and useful Improvements in Thiosalicylic Compounds and Processes of Making Same, of which the following is a specification.

I have discovered that by acting with symmetrical dichlorethylene, or dibromethylene, on a thiosalicylic acid compound I can obtain new compounds. Under the term thiosalicylic acid compound I include thiosalicylic acid itself and also homologues and analogues thereof and derivatives of any of these compounds, for instance dithiosalicylic acid, sulfocyanbenzoic acid, xanthogene-benzoic acid, and the sulfurized benzoic acid derivatives obtainable by treating the corresponding ortho-diazobenzoic acid compounds with alkali polysulfid.

The reaction between the dihalogen-ethylene and the thiosalicylic acid compound should always be carried out in the presence of sufficient metal to combine with the halogen of the dihalogen-ethylene employed. This can be brought about for instance in the case of thiosalicylic acid itself by employing the potassium salt thereof, in which case the reaction can be represented by the equation

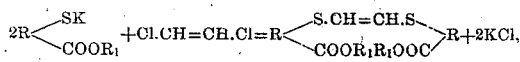

where R= a benzene, or a naphthalene, residue and may be substituted, while $R_1$ = a metal, or an alkyl, including alphyl, and aryl, group. When such a compound as the diethyl ester of dithiosalicylic acid, which cannot form a metallic salt, is employed, the metal necessary can be added in the form of, for instance, caustic potash.

The reaction is preferably carried out in the presence of a solvent and in some cases proceeds better when a slight excess of free alkali above the quantity before stated be present. I term the compounds so obtained acetylene-bis-thiosalicylic acid compounds, although they may also be called bis-methinthiosalicylic acid compounds. In the form of their free acids they are difficultly soluble in the usual organic solvents. They consist of from white to slightly yellow powders and on treatment with an acid condensing agent are converted directly into coloring matters of the thioindigo group. I do not, however, in this application claim such conversion into coloring matter, since this forms the subject matter of a separate application.

The following examples will serve to illustrate further the nature of my invention and how it can be carried into practical effect, but the invention is not confined to these examples. The parts are by weight.

Example 1: Boil together, in a reflux apparatus on the water-bath, twenty-three (23) parts of dipotassium salt of thiosalicylic acid, two (2) parts of caustic potash and one hundred and seventy (170) parts of alcohol, and add slowly ten (10) parts of dichlorethylene. After a short time potassium chlorid and potassium acetylene-bisthiosalicylate begin to separate out. Heat for from eight (8), to ten (10), hours and, when cold, filter off the product which has separated out, dissolve it in water and acidify it, whereupon free acetylene-bisthiosalicylic acid is obtained. It is a white amorphous powder which is very difficultly soluble in most organic solvents, but yields a yellowish red solution in concentrated sulfuric acid.

Example 2: Boil together, in a reflux apparatus on the water-bath, twenty-three and three-tenths (23.3) parts of para-bromthiosalicylic acid, and eleven and one-fifth (11.2) parts of caustic potash in one hundred and seventy (170) parts of alcohol, and add ten parts (10) of dichlorethylene. Heat for several hours and then filter off the precipitate and dissolve it in hot water and acidify it, whereupon the free acetylene-bis-para-bromthiosalicylic acid is obtained in the form of a slightly yellow precipitate. It is more difficultly soluble than is the unbrominated acid and yields, in warm concentrated sulfuric acid, a yellowish red solution.

Example 3: Add fifteen (15) parts of dichlorethylene to a solution of thirty-six and two-fifths (36.4) parts of the ethyl ester of thiosalicylic acid and eleven and one-fifth (11.2) parts of potassium hydroxid in one hundred (100) parts of alcohol, and heat the whole, in an autoclave, for three (3) hours at a temperature of one hundred and fifty (150) degrees centigrade. When the mixture is cool, filter off the crystalline magma of potassium chlorid and ethyl-acetylene-bis-thiosalicylate and wash it with water and alcohol. On crystallizing the residue from alcohol the ethyl ester of acetylene-bis-thiosalicylic acid can be obtained in colorless needles melting at one hundred and fifty-five (155) degrees centigrade and yielding, in sulfuric acid, a yellow solution which, upon heating, becomes of an orange color and subsequently green.

Example 4: Boil together, in a reflux apparatus, fifteen and three-tenths (15.3) parts of dithiosalicylic acid, thirteen and one-half (13.5) parts of potassium hydroxid, and fifty (50) parts of alcohol, and add to the solution, drop by drop, eight (8) parts of dichlorethylene. Boil the whole for from ten (10), to twelve (12), hours, allow it to cool, and then filter off the potassium salt of acetylene-bis-thiosalicylic acid which has separated out. The free acid can be obtained by dissolving the potassium salt in water and adding hydrochloric acid to the solution.

Example 5: Add twenty (20) parts of dichlorethylene to a solution of thirty-five and four-fifths (35.8) parts of sulfocyan-benzoic acid and forty-two (42) parts of potassium hydrate in two hundred and eight (208) parts of alcohol. Boil the whole, in a reflux apparatus, for about five (5) hours, filter off the crystalline precipitate and wash it with alcohol. It consists of potassium chlorid and the potassium salt of acetylene-bis-thiosalicylic acid. In this example forty-eight and two-fifths (48.4) parts of xanthogene-benzoic acid can be used instead of the sulfocyan-benzoic acid.

Example 6: Diazotize fourteen (14) parts of anthranilic acid in the usual manner and allow the diazo solution to run into an aqueous solution of three and one-half (3.5) parts of sulfur and twenty-seven (27) parts of crystallized sodium sulfid, while maintaining the temperature between zero and five (5) degrees below zero centigrade. When the evolution of nitrogen has ceased, acidify with hydrochloric acid, filter off the precipitate and free it from sulfur by dissolving it in sodium carbonate solution, filtering and acidifying the filtrate. Add to the product obtained, while it is still moist, one hundred (100) parts of alcohol and eleven and one-fifth (11.2) parts of potassium hydrate, heat the whole on the water-bath, add, slowly, ten (10) parts of dichlorethylene, and boil for about eight (8) hours. On cooling, the greater part of the dipotassium salt of acetylene-bis-thiosalicylic acid separates out in the crystalline form.

Now what I claim is:

1. The process of producing acetylene-bis-thiosalicylic acid compounds by acting with symmetrical dihalogenethylene on a hereinbefore defined thiosalicylic acid compound substantially as hereinbefore described.

2. The process of producing acetylene-bis-thiosalicylic acid by acting with symmetrical dichlorethylene on the potassium salt of thiosalicylic acid.

3. The process of producing acetylene-bis-thiosalicylic acid by acting with symmetrical dichlorethylene on the potassium salt of thiosalicylic acid in the presence of caustic potash.

4. As new articles of manufacture the acetylene-bis-thiosalicylic acid compounds which can be produced by acting with symmetrical dihalogenethylene on a hereinbefore defined thiosalicylic acid compound which new compounds consist of from white to slightly yellow powders and in the form of their free acids are difficultly soluble in the usual organic solvents and which on treatment with an acid condensing agent are converted directly into coloring matters of the thioindigo group.

5. As a new article of manufacture acetylene-bis-thiosalicylic acid which consists of a white amorphous powder, is difficultly soluble in most organic solvents, yields a yellowish red solution in concentrated sulfuric acid and which on treatment with an acid condensing agent is converted directly into coloring matters of the thioindigo group.

In testimony whereof I have hereunto set my hand in the presence of two subscribing witnesses.

EDUARD MÜNCH.

Witnesses:
J. ALEC. LLOYD,
R. A. SIGSBEE.